(12) United States Patent
Usami et al.

(10) Patent No.: US 6,463,370 B1
(45) Date of Patent: Oct. 8, 2002

(54) INFORMATION PROCESSING APPARATUS, METHOD FOR PROCESSING INFORMATION, AND RECORD MEDIUM ON WHICH A PROGRAM FOR SUCH METHOD IS RECORDED

(75) Inventors: Takayuki Usami; Tomoshi Hirayama, both of Tokyo (JP)

(73) Assignee: Sony Corporation, Tokyo (JP)

( * ) Notice: Subject to any disclaimer, the term of this patent is extended or adjusted under 35 U.S.C. 154(b) by 5 days.

(21) Appl. No.: 09/696,936

(22) Filed: Oct. 26, 2000

(30) Foreign Application Priority Data

Nov. 9, 1999 (JP) .............................. 11-317736

(51) Int. Cl.[7] .......................... G06F 17/60; H04L 12/16
(52) U.S. Cl. ........................................ 701/36; 705/51
(58) Field of Search ...................... 701/1, 36; 702/45; 709/219; 705/51, 26

(56) References Cited

U.S. PATENT DOCUMENTS 5,636,276 A * 6/1997 Brugger ...................... 381/77
5,913,180 A * 6/1999 Ryan ............................ 235/375
6,067,008 A * 5/2000 Smith .......................... 320/109
6,185,501 B1 * 2/2001 Smith et al. ................. 235/384

FOREIGN PATENT DOCUMENTS

GB    2 332 772 A   *  6/1999
JP    11-212784     *  8/1999

* cited by examiner

Primary Examiner—Michael J. Zanelli
(74) Attorney, Agent, or Firm—Oblon, Spivak, McClelland, Maier & Neustadt, P.C.

(57) ABSTRACT

An information processing apparatus first detects the residual amount of gasoline remaining in the gasoline tank, and reads out a prescribed value given as a licensed condition. Next, the apparatus reproduces a musical composition. Then the apparatus calculates the consumption amount of gasoline, and waits till the result of the calculation exceeds the licensed condition while reproducing the musical composition. When the apparatus judges that the consumption amount of gasoline exceeds the licensed condition, the apparatus stops the reproduction of the musical composition. And then, the apparatus erases the musical composition data of the musical composition.

14 Claims, 9 Drawing Sheets

INFORMATION PROCESSING APPARATUS, METHOD FOR PROCESSING INFORMATION, AND RECORD MEDIUM ON WHICH A PROGRAM FOR SUCH METHOD IS RECORDED

BACKGROUND OF THE PRESENT INVENTION

1. Field of the Invention

The present invention relates to an information processing apparatus, a method for processing information, and a record medium on which a program for such method is recorded, and in particular this invention relates to an information processing apparatus, a method for processing information, and a record medium on which a program for such method is recorded that are made to be capable of transmitting data to a motor vehicle to be used within a licensed condition.

2. Description of the Related Art

Ordinary, a motor vehicle such as a car is equipped with an audio reproduction apparatus for reproducing a compact disc, a cassette tape and the like. A driver or a customer can listen to a piece of music recorded in, for example a compact disc or a cassette tape, which the driver purchased for himself at a store, in the car by reproducing it with the audio reproduction apparatus. On the other hand, the number of cars equipped with a navigation apparatus, too, has recently increased. In such a car, a driver can get road guidance by reproducing a purchased CD-ROM having recorded map information with the navigation apparatus.

However, in such a case, there is a problem that there exists a trouble for a driver to have to purchase a record medium such as a compact disc, a cassette tape or a CD-ROM in which desired information is recorded and have to bring it into a car as described above.

Then, Japanese Laid-open Patent, H 9-185798 and H 10-73440 disclose a system in which a connector for data communication is provided on, for example an outer edge portion of a refuel opening for gasoline on the side of a car. In this system, a connecting cable is provided on an refueling handle of an refueling apparatus of a gas station, and thereby the information that a driver desires (such as musical composition data or map data) is transmitted to a reproduction apparatus or a navigation apparatus equipped on the car while an refueling nozzle of the refueling apparatus is inserted into the refuel opening of the car for refueling.

However, there is a problem that there are not proposed variety of services concerning the utilization of the information to be transmitted, for example the discount of charge for providing information in proportion to the amount of refueling or the limitation of time for using the information.

SUMMARY OF THE INVENTION

Accordingly, the present invention was made in consideration of such a situation. Then, a first object of the invention is to provide an information processing apparatus capable of supplying variety of services.

An information processing apparatus according to an embodiment of the present invention comprises: first reception means for receiving a signal corresponding to an amount of supply of power energy supplied to a vehicle, the signal being transmitted from a supply apparatus; second reception means for receiving a second data for discriminating the first data, the second data being transmitted from the supply apparatus; decision means for deciding a licensed condition limiting usage of the first data in the reproduction apparatus on a basis of the signal corresponding to the amount of supply received by the first reception means; acquisition means for acquiring the first data discriminated from the second data received by the second reception means; and transmission means for transmitting the licensed condition decided by the decision means and the first data acquired by the acquisition means to the supply apparatus.

In the information processing apparatus, the first data may be a musical composition data and the second data may be a musical composition ID for identifying the musical composition.

A method for processing information according to an embodiment the present invention comprises the steps of: receiving a signal corresponding to an amount of supply of power energy supplied to a vehicle, the signal being transmitted from a supply apparatus; receiving a second data for discriminating a first data, the second data being transmitted from the supply apparatus; deciding a licensed condition limiting usage of the first data in a reproduction apparatus on a basis of the signal corresponding to the amount of supply received at the step of receiving the signal; acquiring the first data discriminated from the second data received at the step of receiving the second data; and transmitting the licensed condition decided at the step of deciding the licensed condition and the first data acquired at the step of acquiring the first data to the supply apparatus.

In the method, the first data may be a musical composition data and the second data may be a musical composition ID for identifying the musical composition.

A record medium according to an embodiment of the present invention has a recorded program making a computer execute a process comprising the steps of: inputting a signal corresponding to an amount of supply of power energy supplied to a vehicle, the signal being transmitted from a supply apparatus; inputting a second data for discriminating a first data, the second data being transmitted from the supply apparatus; deciding a licensed condition limiting usage of the first data in the reproduction apparatus on a basis of the signal corresponding to the amount of supply inputted at the step of inputting the signal; acquiring the first data discriminated from the second data inputted at the step of inputting the second data; and outputting the licensed condition decided at the step of deciding the licensed condition and the first data acquired at the step of acquiring the first data to the supply apparatus.

In the record medium, the first data may be a musical composition data and the second data may be a musical composition ID for identifying the musical composition.

In the information processing apparatus, the method for processing information or the record medium according to an embodiment of the present invention, the signal transmitted from the supply apparatus and corresponding to the amount of supply of the power energy supplied to the vehicle is inputted, and the second data transmitted from the supply apparatus for discriminating the first data is inputted, and further the licensed condition limiting the usage of the first data in the reproduction apparatus is decided on the basis of the inputted signal corresponding to the amount of supply, and further the first data discriminated from the inputted second data is acquired, and further the decided licensed condition and the acquired first data are outputted to the supply apparatus. Consequently, variety of services can be provided.

An information processing apparatus according to another embodiment of the present invention comprises: first transmission means for transmitting a signal corresponding to an amount of supply of the power energy supplied to a vehicle to a server; first reception means for receiving a second data for discriminating a first data, the second data being transmitted from a reproduction apparatus; second transmission means for transmitting the second data received by the first reception means to the server; second receiving means for receiving the first data, which is transmitted from the server and is discriminated from the second data transmitted from the second transmission means, and for receiving a licensed condition limiting usage of the first data in the reproduction apparatus, the licensed condition being decided on a basis of the signal corresponding to the amount of supply, the signal being transmitted from the first transmission means; and third transmission means for transmitting the first data and the licensed condition received by the second reception means to the reproduction apparatus.

In the information process means, the first reception means may receive the second data transmitted from the reproduction apparatus as an optical signal, and the third transmission means may transform the first data and the licensed condition received by the second reception means to other optical signals to output them to the reproduction apparatus.

A method for processing information according to another embodiment of the present invention comprises the steps of: transmitting a signal corresponding to an amount of supply of the power energy supplied to a vehicle to a server; receiving a second data for discriminating a first data, the second data being transmitted from a reproduction apparatus; transmitting the second data received at the step of receiving the second data to the server; receiving the first data, which is transmitted from the server and is discriminated from the second data transmitted at the step of transmitting the second data, and a licensed condition limiting usage of the first data in the reproduction apparatus, the licensed condition being decided on a basis of the signal corresponding to the amount of supply, the signal being transmitted at the step of transmitting the signal; and transmitting the first data and the licensed condition received at the step of receiving the first data and the licensed condition to the reproduction apparatus.

A record medium according to another embodiment of the present invention has a recorded program making a computer execute a process comprising the steps of: outputting a signal corresponding to an amount of supply of the power energy supplied to a vehicle to a server; inputting a second data for discriminating a first data, the second data being transmitted from a reproduction apparatus; outputting the second data inputted at the step of inputting the second data to the server; inputting the first data, which is transmitted from the server and is discriminated from the second data outputted at the step of outputting the second data, and a licensed condition limiting usage of the first data in the reproduction apparatus, the licensed condition being decided on a basis of the signal corresponding to the amount of supply, the signal being outputted at the step of outputting the signal; and outputting the first data and the licensed condition inputted at the step of inputting the first data and the licensed condition to the reproduction apparatus.

In the information processing apparatus, the method for processing information or the record medium according to another embodiment of the present invention, the signal corresponding to the amount of supply of the power energy supplied to the vehicle is outputted to the server, and the second data for discriminating the first data, the second data being transmitted from the reproduction apparatus, is inputted, and further the inputted second data is outputted to the server, and further the first data, which is transmitted from the server and is discriminated from the outputted second data, and a licensed condition limiting the usage of the first data in the reproduction apparatus, the licensed condition being decided on the basis of the outputted signal corresponding to the amount of supply, are inputted, and further the inputted first data and the licensed condition are outputted to the reproduction apparatus. Consequently, services rich in further variation can be provided.

An information processing apparatus according to still another embodiment of the present invention comprises: transmission means for transmitting a second data for discriminating a first data to a supply apparatus; reception means for receiving the first data and a licensed condition limiting the usage of the first data, the first data and the licensed condition being transmitted from the supply apparatus; and execution means for executing a process for using the first data on the basis of the licensed condition received by the reception means.

In the information processing apparatus, the transmission means may transform the second data into a optical signal to output it to the supply apparatus, and the reception means may receive the first data and the licensed condition from the supply apparatus as other optical signals.

A method for processing information according to still another embodiment of the present invention comprises the steps of: transmitting a second data for discriminating a first data to a supply apparatus; receiving the first data and a licensed condition limiting usage of the first data, the first data and the licensed condition being transmitted from the supply apparatus; and executing a process for using the first data on the basis of the licensed condition received at the step of receiving the first data.

A record medium according to still another embodiment of the present invention has a record program making a computer execute a process comprising the steps of: outputting a second data for discriminating a first data to a supply apparatus; inputting the first data and a licensed condition limiting usage of the first data, the first data and the licensed condition being transmitted from the supply apparatus; and executing another process for using the first data on the basis of the licensed condition inputted at the step of inputting the first data.

In the information processing apparatus, the method for processing information or the record medium according to still another embodiment of the present invention, the second data for discriminating the first data is outputted to the supply apparatus, and the first data and the licensed condition limiting the usage of the first data, the first data and the licensed condition being transmitted from the supply apparatus, are inputted, and further the process for using the first data is executed on the basis of the inputted licensed condition. Consequently, variety of services can be provided.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

Figure 1:
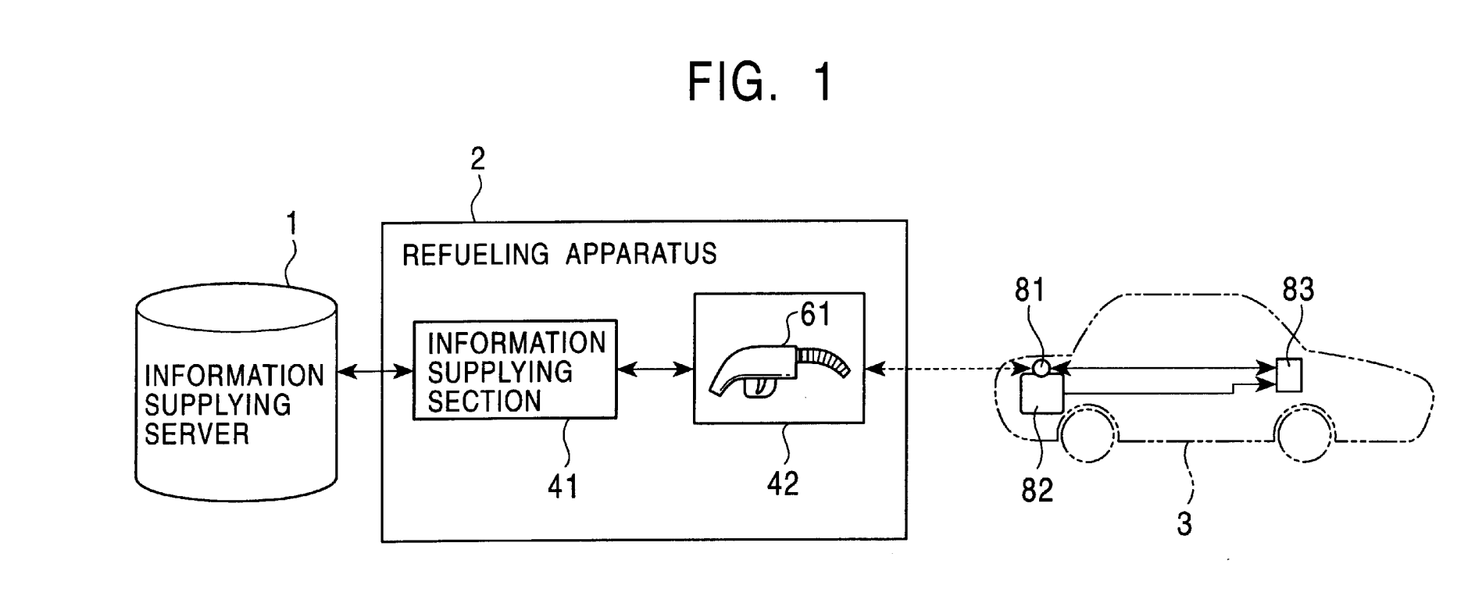
FIG. 1 is a block diagram showing the structure of a music composition supply service system to which the present invention is applied.

FIG. 1 shows a structure of information data such as a musical composition data supply system to which the present invention is applied. In the musical composition data supply system, an information supply server 1 is equipped at a gas station in addition to a refueling apparatus (supply apparatus) 2. While gasoline is refueled to a car 3 comes to the gas station, prescribed information data usable under a prescribed licensed condition (musical composition data in this case) is transmitted to a reception reproduction section 83 of the car 3. Thereby, a driver (user) can utilize (reproduce) a transmitted musical composition data within a scope of the licensed condition by using the reception reproduction section 83.

Figure 2:
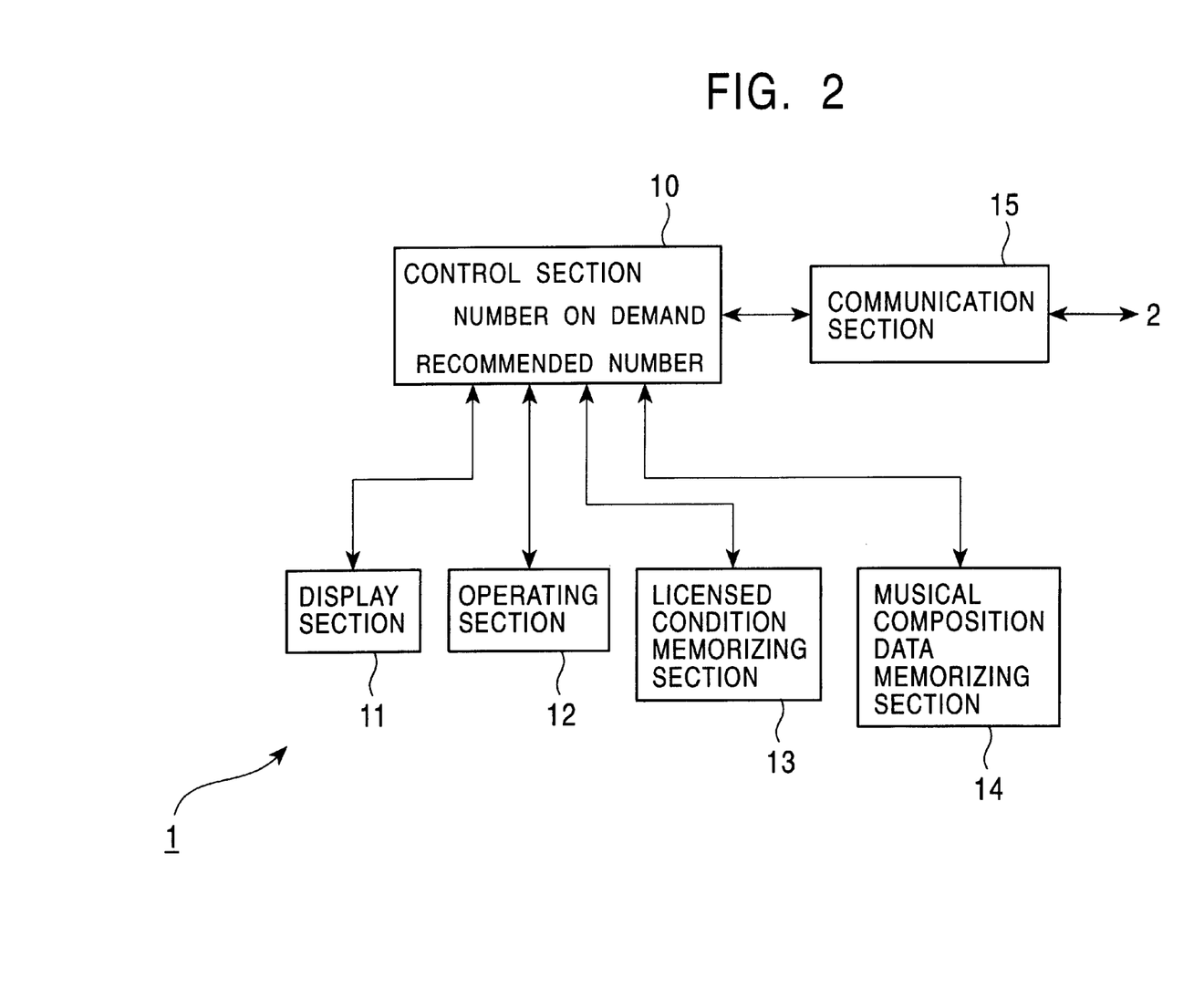
FIG. 2 is a block diagram showing the structure of the information supplying server shown in FIG. 1.

FIG. 2 shows a structure of the information supplying server 1. A display section 11 is composed of an LCD (Liquid Crystal Display) and the like and displays various information. An operating section 12 is composed of a keyboard and the like, and is handled appropriately by, for example an employee of the gas station (hereafter called simply as "employee") when a prescribed order is inputted into a control section 10.

A licensed condition memorizing section 13 memorizes, for example licensed conditions of musical composition data at each refueling amount or each amount of payment. A musical composition data memorizing section 14 memorizes musical composition data to be transmitted.

A communication section 15 performs the processing of communication with the refueling apparatus 2.

The control section 10 controls the display section 11, the operating section 12, the musical composition data memorizing section 14 and the communication section 15. The control section 10 stores names of musical compositions, such as ID's of the musical compositions, which are previously inputted by employees with the operating section 12 to be recommended to customers (drivers), hereafter which are called as "recommended numbers", and names of musical compositions, such as ID's of musical compositions, which can be selected by customers for purchasing, hereafter which are called as "numbers on demand".

FIG. 1 is again referred, and the refueling apparatus 2 is composed of an information supplying section 41 and a refueling section 42. The information supplying section 41 is connected to the information supplying server 1 and the refueling section 42. The information supplying section 41 receives signals transmitted from the information supplying server 1 such as musical composition data, and outputs them to the refueling section 42. The information supplying section 41 also transmits signals, which are inputted by the refueling section 42, from the car 3 such as ID's of the musical compositions to the information supplying server 1. The information supplying section 41 furthermore calculates information supply charges and refuel charges to display them to the employee or the customer.

Figure 3:
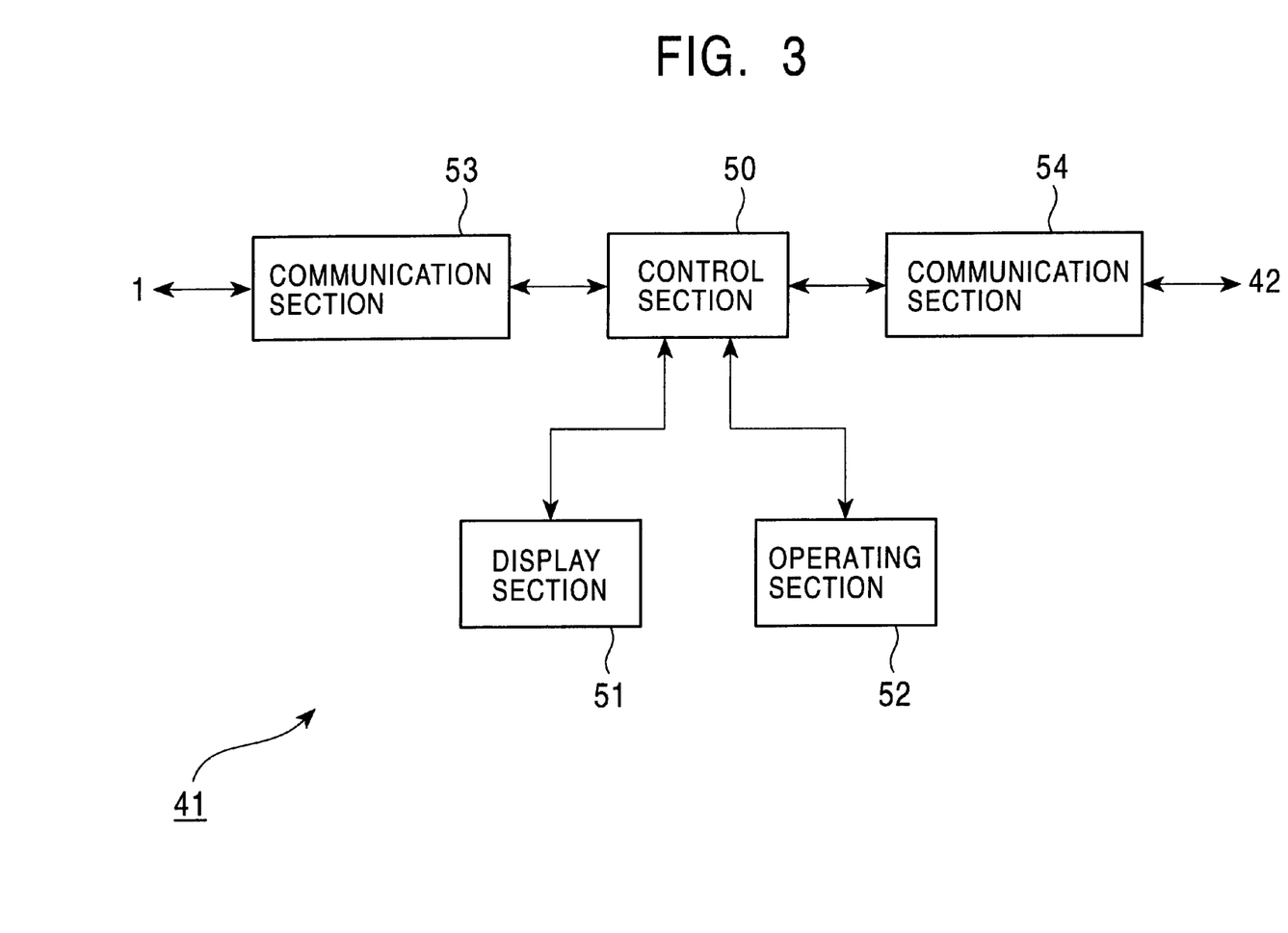
FIG. 3 is a bock diagram showing the information supplying section shown in FIG. 1.

FIG. 3 shows a structure of the information supplying section 41 of the refueling apparatus 2. A display section 51 is composed of a LCD and the like, and displays various information. An operating section 52 is composed of a keyboard and the like, and is appropriately handled by the employee when a prescribed order is inputted into a control section 50.

A communication section 53 communicates with the information supplying server 1, especially with the communication section 15, and receives musical composition data and so forth transmitted from the information supplying server 1 to output them to the control section 50, and further transmits the ID's of the musical compositions and so forth inputted by the control section 50 to the information supplying server 1. A communication section 54 communicates with the refueling section 42, and outputs ID's of musical compositions and so forth transmitted from the refueling section 42 to output them to the control section 50, and further outputs the musical composition data and so forth inputted by the control section 50 to the refueling section 42.

The control section 50 controls the display section 51, the operating section 52 and the communication sections 53 and 54.

Figure 4A:
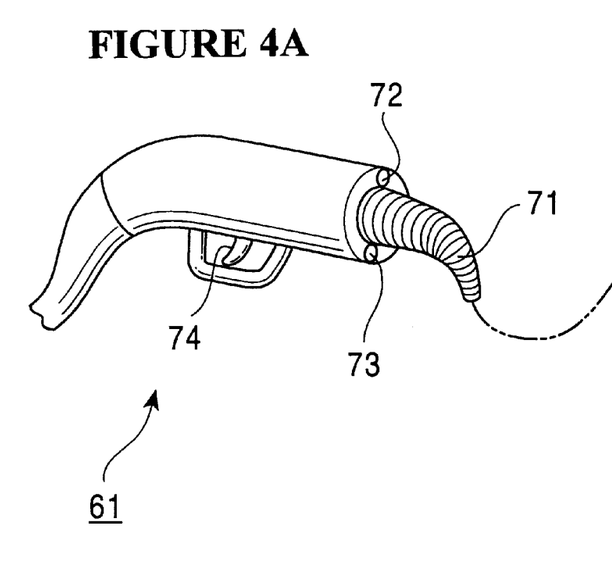
FIG. 4A and FIG. 4B are schematic perspective view showing the external appearances of the fitting section and the refuel port/communication section, respectively, both shown in FIG. 1.
Figure 4B:
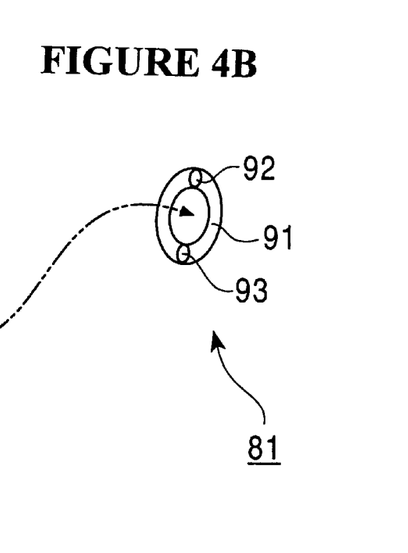

FIG. 4A shows an external appearance of a fitting section 61 in the refuel section 42. The fitting section 61, to which a refuel hose to be supplied with gasoline is connected, is fitted to a refuel port/communication section 81 in a manner that a refuel pipe 71 of the fitting section 61 is inserted into a refuel port 91. As shown in FIG. 4B, the refuel port 91 is equipped on a side face in the rear portion of the main body of the car 3 as a part of the refuel port/communication section 81. An optical link for data transmitting 72 is optically connected with an optical link for data receiving 92 in the refuel port/communication section 81 and an optical link for data receiving 73 is optically connected with an optical link for data transmitting 93 in the refuel port/communication section 81.

A lever 74 in the fitting section 61 is handled when refueling is started, and thereby gasoline is released from the refuel pipe 71. The lever 74 is also handled when for example the musical composition data is outputted from the optical link for data transmitting 72, and thereby the musical composition data transformed into optical signals are outputted from the optical link for data transmitting 72 to be inputted into the optical link for data receiving 92 in the refuel port/communication section 81 of the car 3.

FIG. 1 is again referred, and the car 3 has a fuel tank 82 and the reception reproduction section 83 as well as the refuel port/communication section 81 shown in FIG. 4B and arranged on the side face in the rear portion of the main body. The fuel tank 82 stores gasoline refueled through the refuel port/communication section 81.

The reception reproduction section 83 receives for example musical composition data transmitted from the refueling apparatus 2 through the refuel port/communication section 81 to reproduce them, and transmits for example the ID of a musical composition to the refueling apparatus 2 through the refuel port/communication section 81. The reception reproduction section 83 also receives detection results of a residual amount detection device, not shown, for detecting the residual amount of the gasoline stored in the fuel tank 82.

Figure 5:
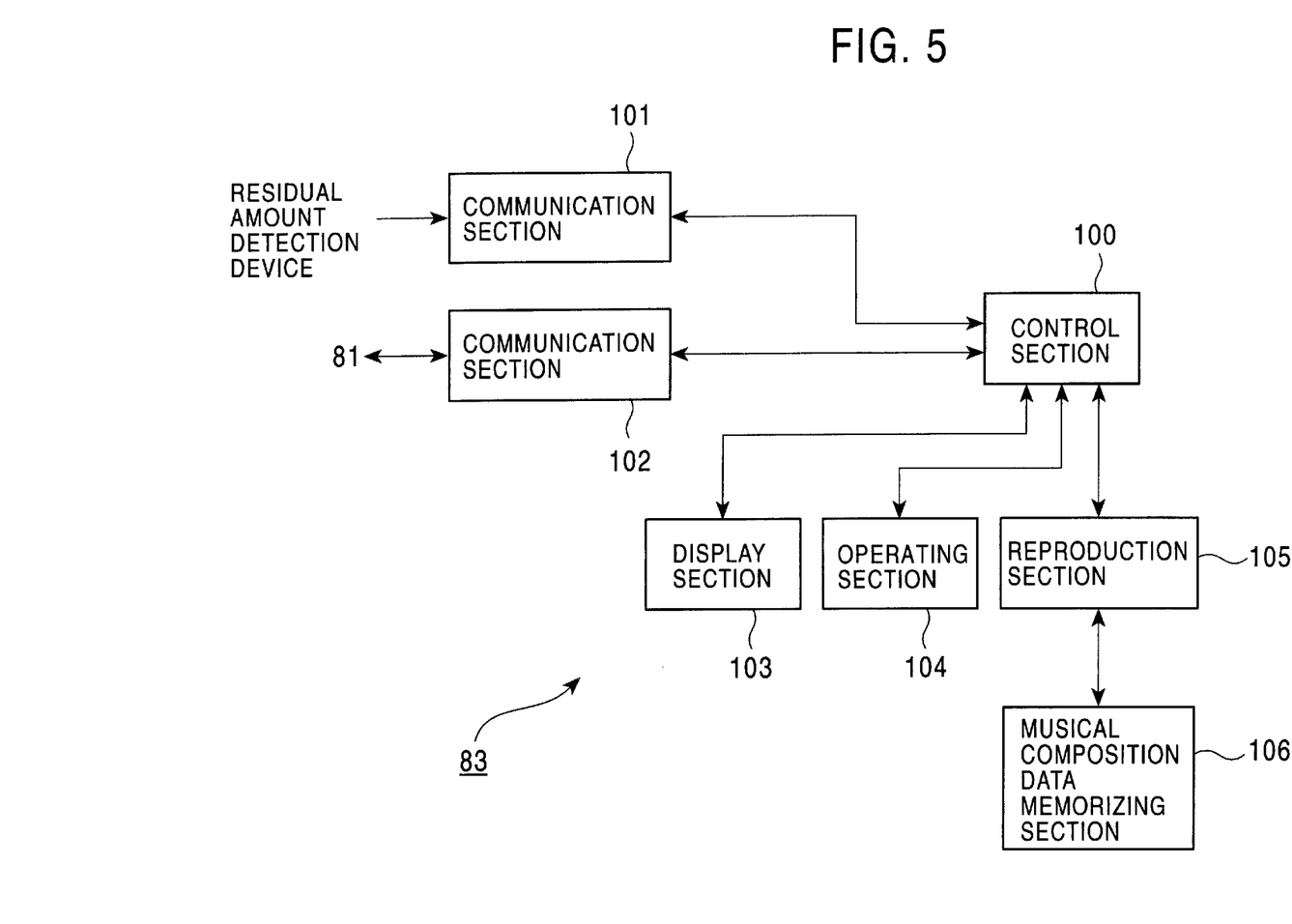
FIG. 5 is a block diagram showing the structure of the reception reproduction section shown in FIG. 1.

FIG. 5 shows a structure of the reception reproduction section 83. A communication section 101 is connected with the residual amount detection device for detecting the residual amount of gasoline stored in the fuel tank 82 to receive the detection results by the residual amount detection device, and then outputs them to a control section 100.

A communication section 102 is connected with the optical link for data receiving 92 in the refuel port/communication section 81 and the optical link for data transmitting 93 to transform optical signals received by the optical link for data receiving 92 into electric signals for outputting them to the control section 100. The communication section 102 also transforms data inputted from the control section 100 into optical signals to output them to the optical link for data transmitting 93.

A display section 103 is composed of an LCD and the like, and displays various information. A operating section 104 is composed of various buttons, a touch panel to be displayed on the display section 103 and the like. The operating section 104 is appropriately handled by the customer when a prescribed order is inputted into the control section 100.

A reproduction section 105 makes a musical composition data memorizing section 106 memorize musical composition data and the like supplied from the refueling apparatus 2, and further reproduces musical composition data stored in the musical composition data memorizing section 106 to output them through a speaker not shown.

Figure 6:
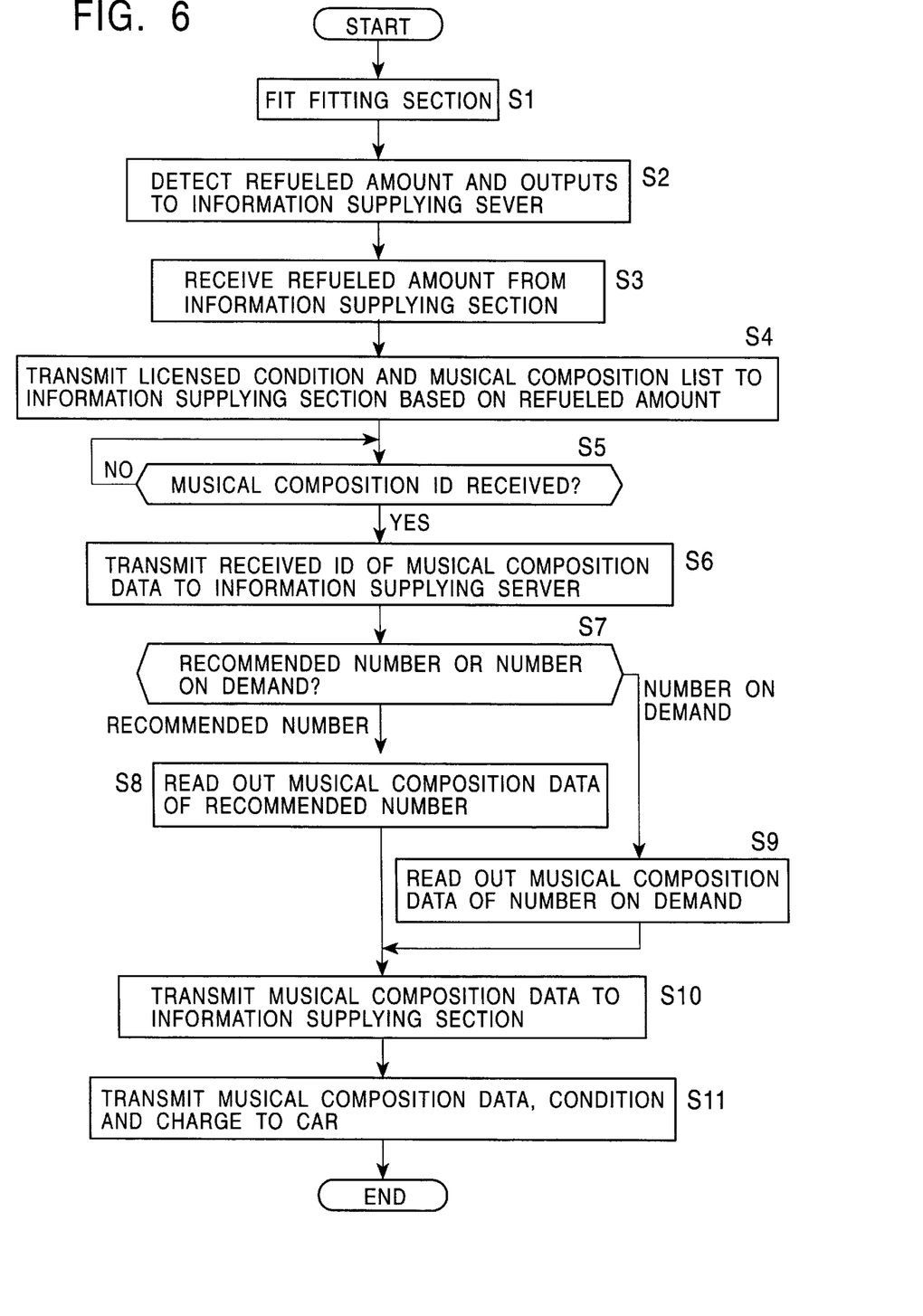
FIG. 6 is a flow chart showing operations of the information supplying server and the information supplying section shown in FIG. 1.

Next, the flow chart shown in FIG. 6 is referred while procedures of transmitting musical composition data to the car 3 are described.

At step S1, the fitting section 61 in the refueling section 42 of the refueling apparatus 2 is fitted to the refuel port/communication section 81 of the car 3 so that refueling of gasoline and data communication for information data become available. And then, gasoline is released from the fitting section 61 to be supplied to the fuel tank 82 in the car 3.

At step S2, the control section 50 in the information supplying section 41 of the refueling apparatus 2 detects the refueled amount of gasoline that is refueled in the car 3 and outputs the detected amount to the information supplying server 1 through the communication section 53.

At step S3, the control section 10 of the information supplying server 1 receives the refueled amount transmitted from the information supplying section 41 in the refueling apparatus 2 through the communication section 15. And then, at step S4, the control section 10 refers to the licensed condition memorizing section 13 and decides a licensed condition of recommended numbers and numbers on demand, which are previously registered or stored, on the basis of the received refueled amount, and further transmits the decided condition to the information supplying section 41 together with a list of the recommended numbers and the numbers on demand (hereafter referred as "musical composition list"). In this case, the musical composition is supposed to be able to be reproduced till the gasoline of the refueled amount is consumed by adding the payment of the charge of three hundred yen. That is, in this case, the licensed condition decided here indicates the value of the refueled amount of gasoline. Incidentally, the musical composition list to be supplied to the information supplying section 41 includes respective music names, singer's names and image data introducing the music of the recommended numbers and numbers on demand.

The musical composition list and the licensed condition transmitted to the information supplying section 41 of the refueling apparatus 2 are received by the communication section 53, and then they are transmitted to the car 3 by the communication section 54.

At step S5, the control section 50 in the information supplying section 41 waits until the ID of the musical composition selected in the musical composition list transmitted at the step S4 is transmitted by the communication section 54 from the car 3 through the refueling section 42 and is received by the control section 50. And then, the control section 50 advances the process to step S6 when the ID of the musical composition is received and transmits the received ID of the musical composition to the information supplying server 1 through the communication section 53.

At step S7, the control section 10 in the information supplying server 1 receives the ID of the musical composition transmitted from the information supplying section 41, and judges whether the ID belongs to a recommended number or a number on demand. If the control section 10 judges that the ID belongs to a recommended number, namely if a recommended number is selected by the customer, the control section 10 advances the process to step S8, and then reads out the musical composition data of the recommended number specified by the ID from the musical composition data memorizing section 14. On the other hand, if the received ID is judged to be the ID of a number on demand at the step S7, the control section 10 advances the process to step S9, and then reads out the musical composition data of the number on demand specified by the ID from the musical composition data memorizing section 14.

After the control section 10 in the information supplying server 1 reads out the musical composition data at the step S8 or the step S9, the control section 10 advances the process to step S10, and then transmits the readout musical composition data to the information supplying section 41 together with the licensed condition decided at the step S4 through the communication section 15.

At step S11, when the control section 50 in the information supplying section 41 receives the musical composition data and the licensed condition transmitted from the information supplying server 1 through the communication section 53, the control section 50 transmits the received musical composition data and the licensed condition to the car 3 along with the musical composition data supplying charge (three hundred yen in this case) and the gasoline refuel charge. After that, the process is finished.

Figure 7:
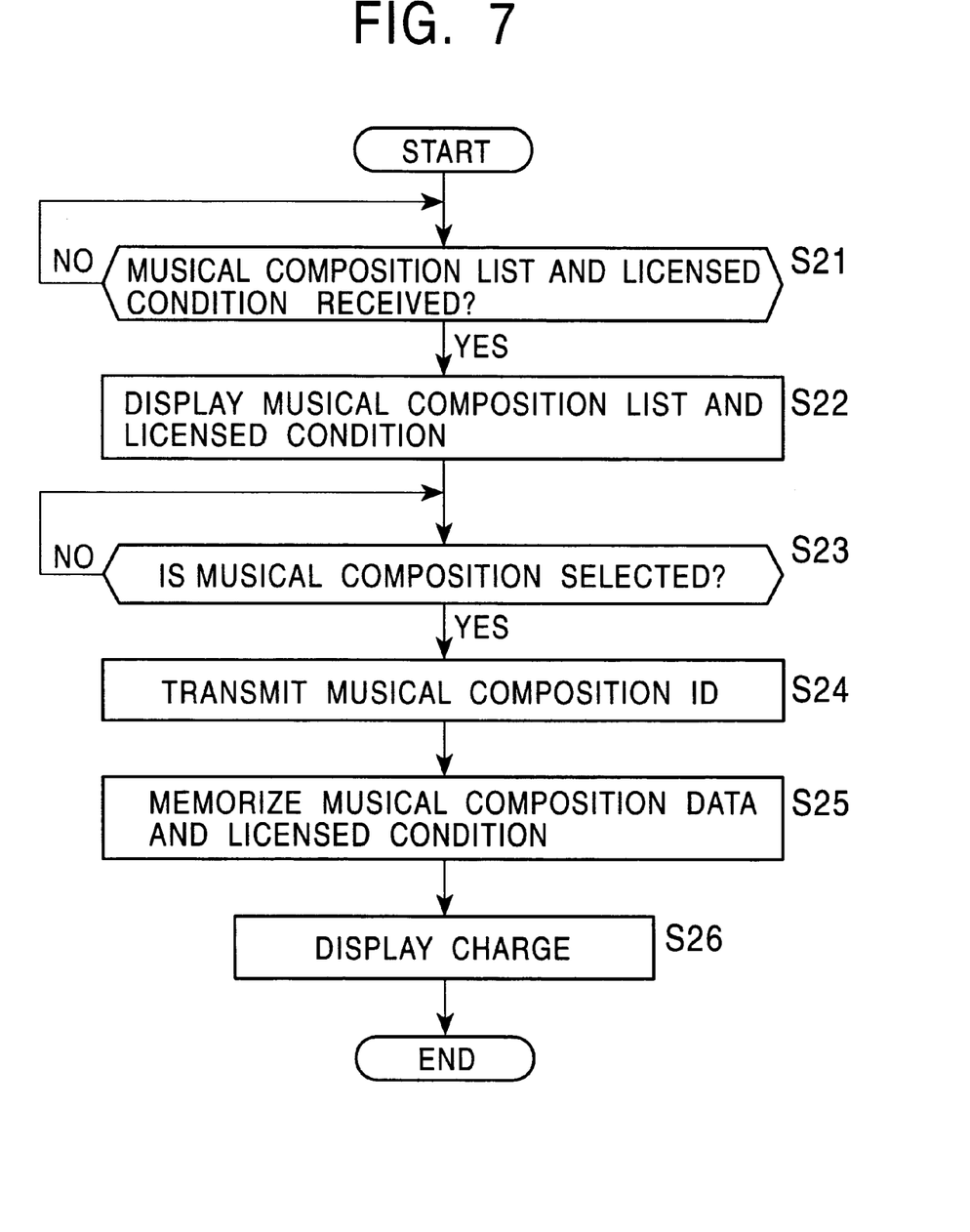
FIG. 7 is a flow chart showing an operation of the reception reproduction section shown in FIG. 1.

Next, a flow chart shown in FIG. 7 is referred while the operations of the reception reproduction section 83 of the car 3 in this case are described.

At step S21, the control section 100 in the reception reproduction section 83 waits until the musical composition list and the licensed condition transmitted from the refueling apparatus 2 by the communication section 102 (i.e. the musical composition list and the licensed condition transmitted in the process at the step S4 in FIG. 6) are received. And when they are received, the control section 100 advances the process to step S22, and then makes the display section 103 display the received musical composition list, or the list of the recommended numbers and the numbers on demand, and the licensed condition. In this case, there are displayed on the display section 103 the musical composition list and a message indicating that the usage of music for one hour is permitted by the payment of three hundred yen per a piece of music or per one litter of the refueled amount of gasoline.

At step S23, the control section 100 waits until a musical composition that the customer desires is selected among the musical compositions in the musical composition list displayed on the display section 103 by the customer's operation of the operating section 104. When the musical composition is selected, the control section 100 advances the process to step S24. At the step S24, the control section 100 outputs the ID of the selected musical composition to the refuel port/communication section 81 through the communication section 102. Consequently, the ID of the selected musical composition is transmitted to the refueling apparatus 2 through the refuel port/communication section 81.

Next, at step S25, the control section 100 receives the musical composition data, the licensed condition, the musical composition supplying charge and the refuel charge transmitted from the refueling apparatus 2 (i.e. the musical composition data, the license data, the musical composition supplying charge and the refuel charge transmitted in the process at the step S11 in FIG. 6) through the communication section 102, and makes the musical composition data memorizing section 106 memorize the musical composition data and the licensed condition among them.

At step S26, the control section 100 makes the display section 103 display the musical composition supplying charge and the refuel charge received at the step S25 to urge the payment of the charges to the customer. After that, the process is finished.

Figure 8:
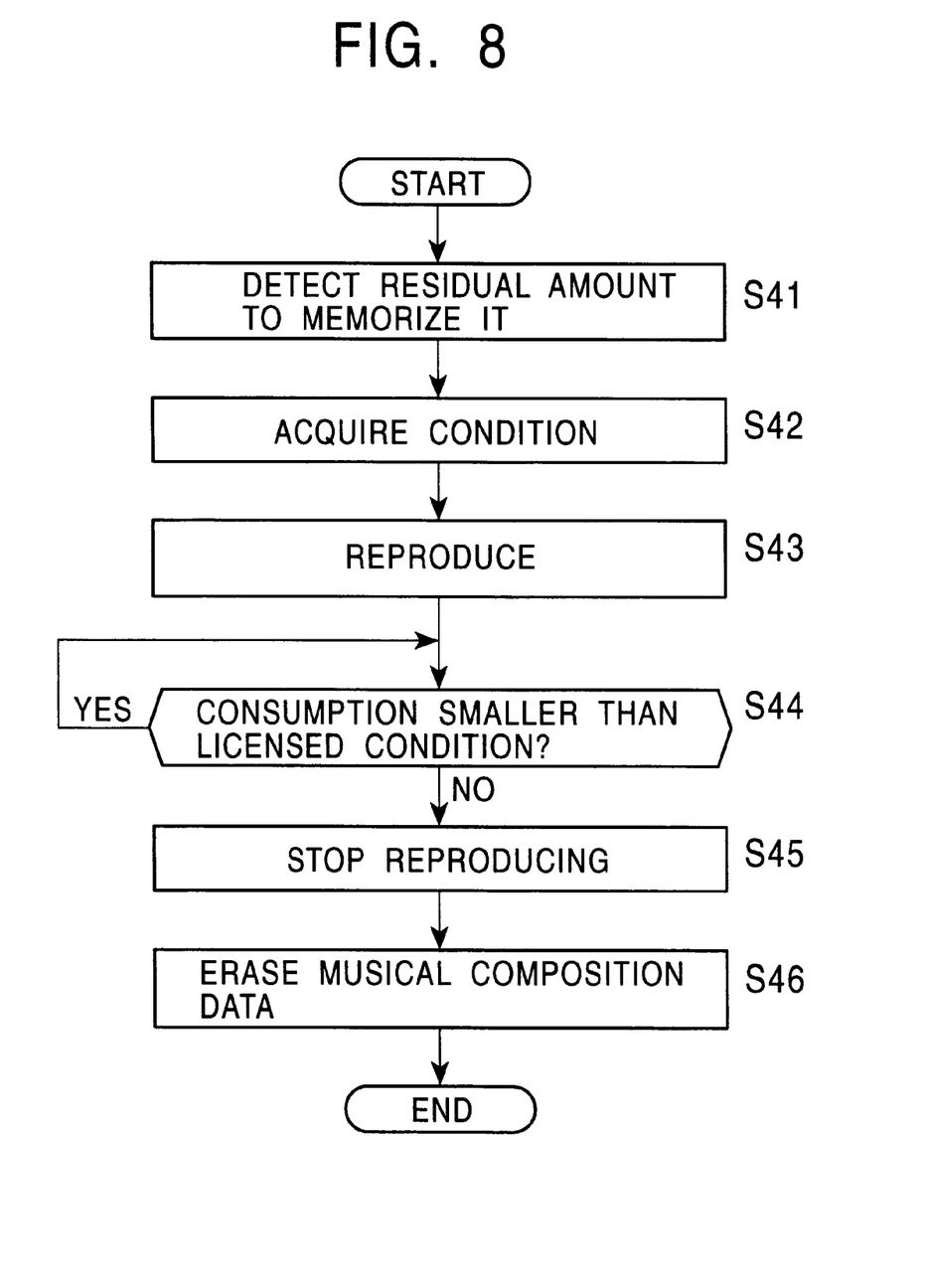
FIG. 8 is a flow chart showing another operation of the reception reproduction section shown in FIG. 1.

Next, a flow chart shown in FIG. 8 is referred while the procedures of the reception reproduction section 83 of the car 3 in case of utilizing, or reproducing, the supplied musical composition data are described.

When the customer of the car 3 handles the operating section 104 of the reception reproduction section 83 so as to reproduce the musical composition transmitted from the gas station, at step S41, the control section 100 in the reception reproduction section 83 receives detection results from the residual amount detection device for detecting the residual amount of the refueled gasoline remaining in the fuel tank 82 to memorize them.

Next, at step S42, the control section 100 acquires the licensed condition of the musical composition selected by the customer's operation of the operating section 104 from the musical composition data memorizing section 106 through the reproduction section 105.

At step S43, the control section 100 orders the reproduction section 105 to reproduce the musical composition selected by the driver's operation of the operating section 104. Thereby, the reproduction section 105 reads out the musical composition data of the musical composition the reproduction of which is ordered from the musical composition data memorizing section 106 to reproduce and outputs them from the not shown speaker.

Next, at step S44, the control section 100 receives the residual amount of the refueled gasoline inputted from the residual amount detection device through the communication section 101, and calculates the consumption amount of the refueled gasoline till now on the basis of the residual amount obtained at step S41, and further waits till the consumption amounts exceeds the licensed condition (i.e. the refueled amount of gasoline) obtained at the step S42. While the control section 100 is waiting, it is possible to reproduce musical compositions, and the customer can listen to the musical compositions for the period.

When the consumption amount of the refueled gasoline is judged to exceed the licensed condition at step S44, the control section 100 advances the process to step S45, and the control section 100 controls the reproduction section 105 to stop the reproduction of the musical composition. Then, the control section 100 further advances the process to step S46 to erase the musical compositions stored in the musical composition data memorizing section 106.

As mentioned above, because the embodiment employs the system that a licensed condition of musical composition data is decided in accordance with a refueled amount and that a customer (driver) may use the musical composition data within the scope of the licensed condition, it becomes possible to supply more variety of services to the customer.

Incidentally, the gas station calculates a time for consuming all of the refueled amounts of gasoline on the basis of the general mileage and the general speed of a car, and pays a charge in accordance with the calculated time to Association of Copyright.

In the aforesaid, descriptions are given to an embodiment where the licensed condition is determined on the refueling amount and makes it possible to use the musical composition data until the gasoline of the refueling amount is consumed. However, for example, it may be possible to calculate the mileage for consuming the refueling amount of gasoline and to set the mileage as the licensed condition for permitting the usage of the musical composition data until the car 3 has run the mileage of the licensed condition. Incidentally, in this case, it is necessary for the reception production section 83 of the car 3 to judge whether the car 3 has run more than the mileage decided in the licensed condition or not by receiving the rotation number of a tire from a rotation number detection device and by calculating the mileage on the basis of the rotation number.

Furthermore, it is possible to permit the usage of the musical composition data at a cheaper charge or without any charge when four persons or more are boarded or when the car 3 is going to drive to a prescribed direction or a prescribed area.

Furthermore, in the aforementioned, descriptions are given to a case where a driver selects a musical composition at the time of refueling the car 3. However, it is possible to employ a system that a musical composition list can be supplied to a driver (customer) of the car 3 when the car 3 approaches to the gas station within a fixed distance, and that the customer can select a musical composition before the car 3 arrives at the gas station.

Furthermore, in the aforesaid, descriptions are given to a case where a customer selects a musical composition by operating the operating section 104 in the reception reproduction section 83 mounted on the car 3. However, it is possible to select a musical composition by the employee's operation or the customer's operation of the operating section 52 in the information supplying section 41 of the refueling apparatus 2.

The series of processing aforesaid may be executed by any of hardware and software. Hereafter a description is given to a reception reproduction section 501 performing its series of processing by means of software.

Figure 9:
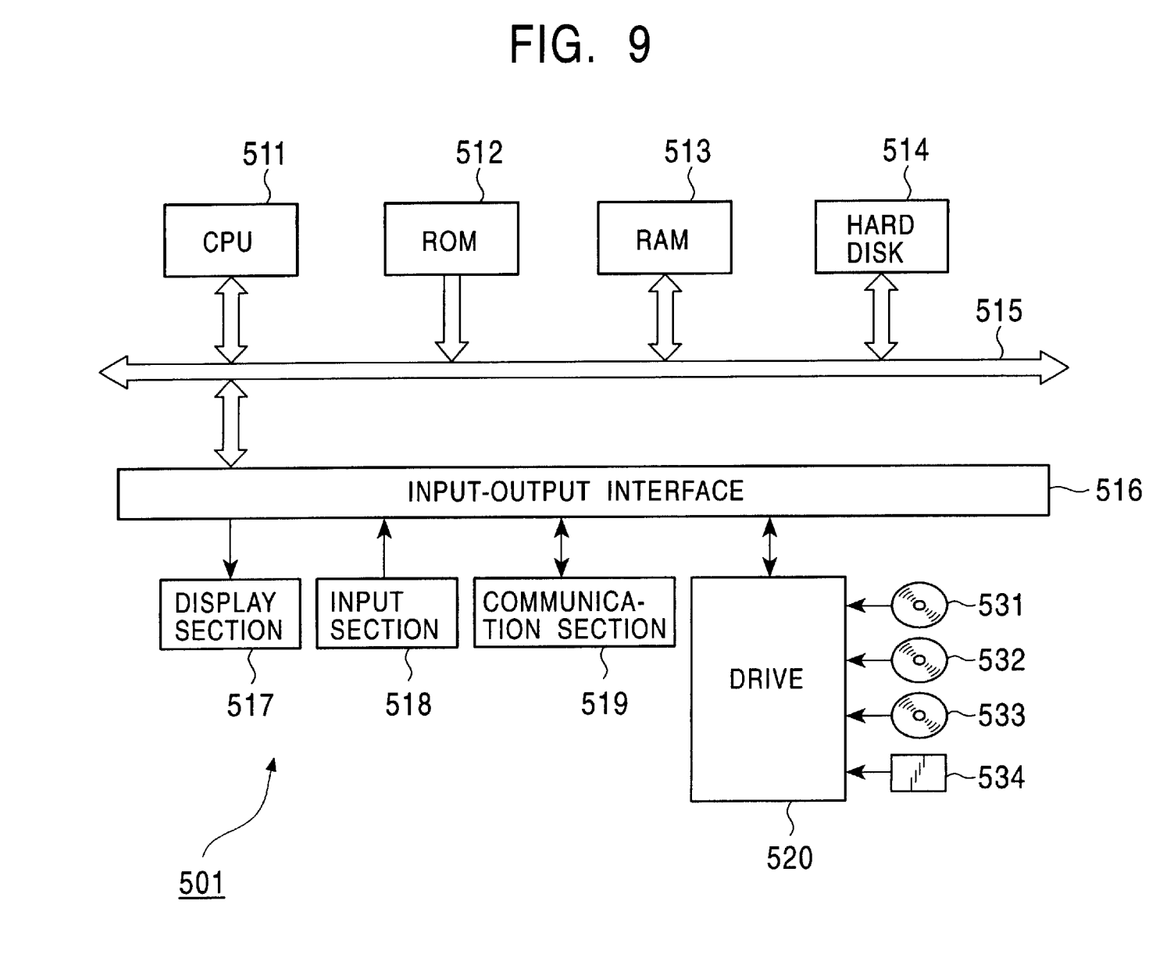
FIG. 9 is a block diagram showing the structure of the reception reproduction section of another embodiment of the present invention.

The reception reproduction section 501 shown in FIG. 9 is composed of a computer, for example. An input-output interface 516 is connected with a CPU (Central Process Unit) 511 through a bus 515. When an order is inputted into the CPU 511 through the input-output interface 516 from an input section 518 composed of a keyboard, a mouse and the like by a customer, the CPU 511 loads a program stored in, for example, a ROM (Read Only Memory) 512, a hard disk 514 or a record medium fitted to a drive 520 such as a magnetic disk 531, an optical disk 532, an optical magnetic disk 533 or a semiconductor memory 534 into a RAM (Random Access Memory) 513 to execute it. Furthermore, the CPU 511 outputs the results of processing to a display section 517 composed of an LCD (Liquid Crystal Display) or the like through, for example, an input-output interface 516 as the need arises. Incidentally, the program is previously memorized in the hard disk 514 or the ROM 512 for being supplied to a customer integrally with the reception reproduction section 501, or for being supplied to a customer as a package medium such as the magnetic disk 531, the optical disk 532, the optical magnetic disk 533, the semiconductor memory 534 or the like, or for being supplied to the hard disk 514 through a communication section 519 from a satellite, a network or the like.

Incidentally, a word "system" in the present specification means the whole apparatus composed of a plurality of apparatuses, means or the like.

Furthermore, the steps describing a program supplied by a medium in the present specification naturally includes not only a process executed in the described order time-serially, but also processes executed in parallel or separately.

Although the invention has been described in its preferred form with a certain degree of particularity, obviously many changes and variations are possible therein. It is therefore to be understood that the present invention may be practiced than as specifically described herein without departing from scope and the sprit thereof.

What is claimed is:

1. An information processing apparatus to be connected to a supply apparatus for supplying a first data to a reproduction apparatus to be equipped on a vehicle, said information processing apparatus comprising:

first reception means for receiving a signal corresponding to an amount of supply of power energy supplied to the vehicle, the signal being transmitted from said supply apparatus;

second reception means for receiving a second data for discriminating the first data, the second data being transmitted from said supply apparatus;

decision means for deciding a licensed condition limiting usage of the first data in said reproduction apparatus on a basis of the signal corresponding to the amount of supply received by said first reception means;

acquisition means for acquiring the first data discriminated from the second data received by said second reception means; and transmission means for transmitting the licensed condition decided by said decision means and the first data acquired by said acquisition means to said supply apparatus.

2. The information processing apparatus according to claim 1, wherein said first data is a musical composition data and said second data is a musical composition ID for identifying the musical composition.

3. A method for processing information in an information processing apparatus to be connected to a supply apparatus for supplying a first data to a reproduction apparatus to be equipped on a vehicle, said method comprising the steps of:

receiving a signal corresponding to an amount of supply of power energy supplied to the vehicle, the signal being transmitted from said supply apparatus;

receiving a second data for discriminating the first data, the second data being transmitted from said supply apparatus;

deciding a licensed condition limiting usage of the first data in said reproduction apparatus on a basis of the signal corresponding to the amount of supply received at the step of receiving the signal;

acquiring the first data discriminated from the second data received at the step of receiving the second data; and transmitting the licensed condition decided at the step of deciding the licensed condition and the first data acquired at the step of acquiring the first data to said supply apparatus.

4. The method according to claim 3, wherein said first data is a musical composition data and said second data is a musical composition ID for identifying the musical composition.

5. A record medium having a recorded program for communicating with a supply apparatus for supplying a first data to a reproduction apparatus to be equipped on a vehicle, said program making a computer execute a process comprising the steps of:

inputting a signal corresponding to an amount of supply of power energy supplied to the vehicle, the signal being transmitted from said supply apparatus;

inputting a second data for discriminating the first data, the second data being transmitted from said supply apparatus;

deciding a licensed condition limiting usage of the first data in said reproduction apparatus on a basis of the signal corresponding to the amount of supply inputted at the step of inputting the signal;

acquiring the first data discriminated from the second data inputted at the step of inputting the second data; and outputting the licensed condition decided at the step of deciding the licensed condition and the first data acquired at the step of acquiring the first data to said supply apparatus.

6. The record medium according to claim 5, wherein said first data is a musical composition data and said second data is a musical composition ID for identifying the musical composition.

7. An information processing apparatus to be connected to a server that supplies power energy to a vehicle and holds a first data to be supplied to a reproduction apparatus to be equipped on the vehicle, said information processing apparatus comprising:

first transmission means for transmitting a signal corresponding to an amount of supply of the power energy supplied to the vehicle to said server;

first reception means for receiving a second data for discriminating the first data, the second data being transmitted from said reproduction apparatus;

second transmission means for transmitting the second data received by said first reception means to said server;

second receiving means for receiving the first data, which is transmitted from said server and is discriminated from the second data transmitted from said second transmission means, and for receiving a licensed condition limiting usage of the first data in said reproduction apparatus, the licensed condition being decided on a basis of the signal corresponding to the amount of supply, the signal being transmitted from said first transmission means; and third transmission means for transmitting the first data and the licensed condition received by said second reception means to said reproduction apparatus.

8. The information process means according to claim 7, wherein:

said first reception means receives said second data transmitted from said reproduction apparatus as an optical signal, and said third transmission means transforms said first data and said licensed condition received by said second reception means to other optical signals to output them to said reproduction apparatus.

9. A method for processing information in an information processing apparatus to be connected to a server that supplies power energy to a vehicle and holds a first data to be supplied to a reproduction apparatus to be equipped on the vehicle, said method comprising the steps of:

transmitting a signal corresponding to an amount of supply of the power energy supplied to the vehicle to said server;

receiving a second data for discriminating the first data, the second data being transmitted from said reproduction apparatus;

transmitting the second data received at the step of receiving the second data to said server;

receiving the first data, which is transmitted from said server and is discriminated from the second data transmitted at the step of transmitting the second data, and a licensed condition limiting usage of the first data in said reproduction apparatus, the licensed condition being decided on a basis of the signal corresponding to the amount of supply, the signal being transmitted at the step of transmitting the signal; and transmitting the first data and the licensed condition received at the step of receiving the first data and the licensed condition to said reproduction apparatus.

10. A record medium having a recorded program for communicating with a reproduction apparatus to be equipped on a vehicle and a server holding a first data to be supplied to said reproduction apparatus, said program making a computer execute a process comprising the steps of:

outputting a signal corresponding to an amount of supply of the power energy supplied to the vehicle to said server;

inputting a second data for discriminating the first data, the second data being transmitted from said reproduction apparatus;

outputting the second data inputted at the step of inputting the second data to said server;

inputting the first data, which is transmitted from said server and is discriminated from the second data outputted at the step of outputting the second data, and a licensed condition limiting usage of the first data in said reproduction apparatus, the licensed condition being decided on a basis of the signal corresponding to the amount of supply, the signal being outputted at the step of outputting the signal; and outputting the first data and the licensed condition inputted at the step of inputting the first data and the licensed condition to said reproduction apparatus.

11. An information processing apparatus to be connected to a supply apparatus for supplying a first data and to be equipped on a vehicle, said information processing apparatus comprising:

transmission means for transmitting a second data for discriminating the first data to said supply apparatus;

reception means for receiving the first data and a licensed condition limiting usage of the first data, the first data and the licensed condition being transmitted from said supply apparatus; and execution means for executing a process for using the first data on a basis of the licensed condition received by said reception means.

12. The information processing apparatus according to claim 11, wherein:

said transmission means transforms said second data into an optical signal to output it to said supply apparatus, and said reception means receives said first data and said licensed condition from said supply apparatus as other optical signals.

13. A method for processing information in an information processing apparatus to be connected to a supply apparatus for supplying a first data and to be equipped on a vehicle, said method comprising the steps of:

transmitting a second data for discriminating the first data to said supply apparatus;

receiving the first data and a licensed condition limiting usage of the first data, the first data and the licensed condition being transmitted from said supply apparatus; and executing a process for using the first data on a basis of the licensed condition received at the step of receiving the first data.

14. A record medium having a recorded program for communicating with a supply apparatus for supplying a first data, said program making a computer execute a process comprising the steps of:

outputting a second data for discriminating the first data to said supply apparatus;

inputting the first data and a licensed condition limiting usage of the first data, the first data and the licensed condition being transmitted from said supply apparatus; and executing another process for using the first data on a basis of the licensed condition inputted at the step of inputting the first data.

* * * * *